UNITED STATES PATENT OFFICE.

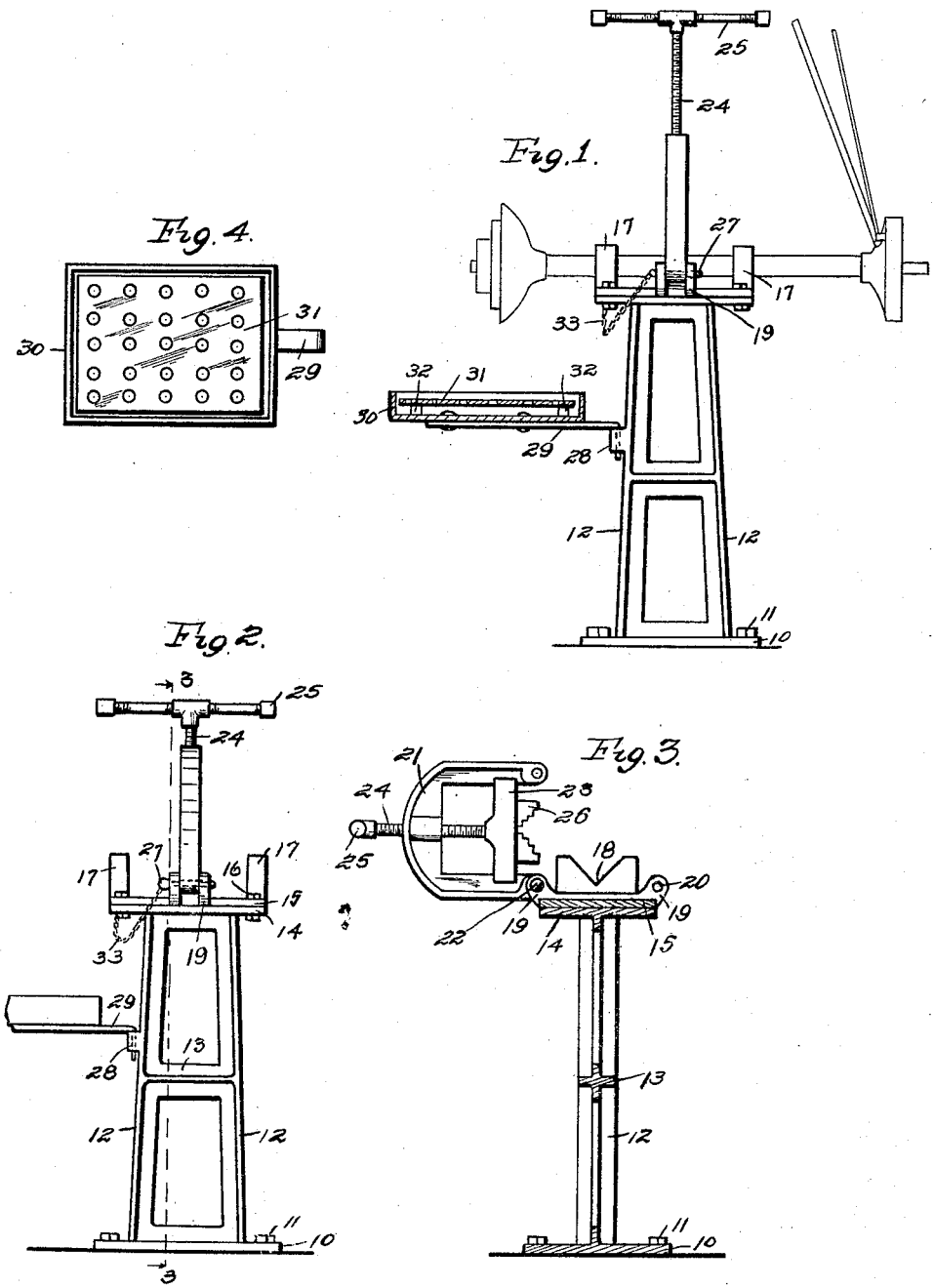

JOSEPH S. CARSWELL, OF BOONE, IOWA.

REAR-AXLE STAND.

1,274,681.

Specification of Letters Patent.    Patented Aug. 6, 1918.

Application filed July 16, 1917.   Serial No. 180,835.

*To all whom it may concern:*

Be it known that I, JOSEPH S. CARSWELL, a citizen of the United States, and resident of Boone, in the county of Boone and State of Iowa, have invented a certain new and useful Rear-Axle Stand, of which the following is a specification.

The object of my invention is to provide a rear axle stand of simple, durable and economical construction.

It will be understood that when the rear axles of automobiles are removed from the machine in a repair shop in order that adjustments and repairs may be made considerable difficulty has been experienced in handling the parts of the axle in a convenient manner and it will be understood that the ordinary automobile axle consists of two housings having at one end the brake drum to which are attached the radius rods at one end; the differential housings are fastened to the other end. The differential housings and the brake drum are of different diameters so that it is impossible to lay the two parts of the axle upon a level surface in such position that the two parts of the differential may be brought together and the axle housements placed in alinement. It has been customary in the past to assemble and take to pieces rear axles upon a floor of the repair shop as the radius rods project from the brake drum make it impracticable to work on the axle on a bench.

A further object of my invention is to provide means whereby one of the axle housings may be supported on a stand in a horizontal position, so that it will be unnecessary to place it on the floor while it is being worked upon.

A further object of my invention is to so arrange the stand and the coöperating parts that the axle housing may be clamped to the stand in such position that the radius rods thereof will extend upwardly out of the way of the operator.

A further object of my invention is to provide clamping means adapted to coöperate with a stand, which will permit ready removal of the axle therefrom and will also permit the axle to be clamped rigidly in place, so it will not move while the operator is working therewith.

A further object of my invention is to provide a receptacle adapted to be secured to the supporting stand below the differential housing, so that when the latter is taken apart, the grease and oil therein will drain into the receptacle. I have also provided this receptacle with means whereby the parts such as nuts and bolts, which are removed from the rear axle may be placed in the receptacle, so that the oil may drain therefrom and these parts being readily accessible when it is desired to use them to assemble the axle.

My invention consists in the construction, arrangement and combination of the various parts of the device, whereby the objects contemplated are attained, as hereinafter more fully set forth, pointed out in my claim and illustrated in the accompanying drawings, in which:

Figure 1 shows a side elevation of my device, parts being shown in section to better illustrate the construction and the part of an automobile rear axle being shown in light lines in order to illustrate the use of the device.

Fig. 2 shows an end elevation.

Fig. 3 shows a vertical, sectional view taken on the line 3—3 of Fig. 2, and

Fig. 4 shows a top or plan view of the combined oil receiving receptacle and tray.

Referring to the accompanying drawings, I have used the reference numeral 10 to indicate generally the base of my stand, which is secured to the floor by any suitable means as for instance the screws 11 projecting upwardly and converging toward each other are the two supporting legs 12 of my stand, which are T shaped in cross section. A brace 13 of cross shape cross section extends between the two legs 12 about half way up, a flat supporting member 14 is secured to the top of the legs 12 and acts as a support for my improved clamping means. The parts heretofore described are cast in one piece. A plate 15 is secured to the member 14 by bolts 16 and has formed thereon two spaced upwardly extending engaging jaws 17. The jaws 17 are provided with downwardly extending V shaped notches 18 arranged in alinement. Midway between the jaws 17 at either side of the plate 15 a pair of spaced ears 19 are formed having alined openings 20 adjacent to their upper ends. A V shaped yoke 21 is designed to have its ends received between the pairs of ears 19. Each end of the yoke 21 is perforated and at one end a pin 22 is passed therethrough and through the alined openings in the adjacent pair of ears 19 in order to form a pivotal support for that end of the yoke. A slide bar 23 extends across the yoke and is adapted to reciprocate between the sides thereof. The reciprocation of the slide bar 23 is governed by a screw threaded rod 24, which passes through a screw threaded opening in the yoke 21 and is rotatably but nonslidably mounted in slide bar 23. A handle 25 is fixed to the upper end of the rod 24 for the convenience of the operator and at 26 is secured to the lower surface of the slide bar 23 and is provided with a V shaped toothed notch. A pin 27 is adapted to pass through the alined openings in the second pair of ears 19 and through the opening in the corresponding end of the yoke 21, so that the yoke may be swung upon its pivot 22 to the position shown in Fig. 3 when the pin 27 is removed or may be securely clamped in the position shown in Figs. 1 and 2 by inserting the pin 27 in said openings when desired. A chain 33 is secured to the stand at any suitable place and attached to the pin 27 so that it will not be lost when it is removed from the openings 20.

An outwardly extending lug 28 is secured to the side of one leg 12 and is preferably cast integral therewith. An elongated vertical opening is formed in the lug 28 and adapted to receive one end of a flat steel bar 29. It will be understood that the cross section of the opening in the lug 28 is substantially the same as the cross section of the bar 29 so that no pivotal movement is permitted. The bar 29 supports a comparatively shallow pan or receptacle 30 which is so disposed that it is directly under the place occupied by the differential housing when the rear axle member is clamped to the stand. The receptacle 30 is provided with a reticulated tray 31, which is spaced from the bottom thereof by any suitable means as legs 32.

It will be seen from the foregoing that I have provided a stand adapted to be provided with a clamping member wherein one of the axle housings of a rear axle may be clamped in such position that the radius rods thereon will extend upwardly out of the way of the person working upon the axle. The stand provided is also of such dimensions that it permits the operator to move freely around the stand and work on any part of the axle. The use of the clamping member shown permits the axle to be rigidly held from movement within the clamp so that it is possible to perform the various operations thereon necessary to assemble or disassemble it. More difficulty has been experienced in the past with removing the pins by which the radius rods are secured to the brake drum as these pins are secured very tightly in their respective openings and usually have to be cut out with a chisel. It will be seen that it is possible to clamp the axle in the most convenient place for the operator working on these pins with his chisel and that the axle is also held from twisting movement caused by unscrewing bolts or the like.

The pan 30 receives the grease and oil from the differential housing of the axle when the two parts of the housing are separated, so that the floor will not become smeared or foul with the slippery grease and oil from the housing. As the housing is taken apart the nuts and bolts removed therefrom may be conveniently dropped upon the reticulated tray 31 where the oil or grease will drain off from them and where they will be instantly accessible when the operator desires to reassemble the axle. The tray 30 is arranged to be instantly removed when it is desirable but also fixed in place so that it is almost impossible for any contact therewith by the operator to move it out of place.

I claim as my invention:

In a device of the class described, a support comprising a pair of parallel slightly spaced vertical legs and a horizontal plate secured to the upper end thereof, a clamping device mounted on said plate comprising a pair of spaced jaws and a yoke having a movable jaw therein and pivoted at one end whereby the yoke may be swung to position where the jaw therein may coact with the first two jaws to hold the automobile rear axle housing from movement and to swing upon its pivot whereby the said housing may be removed, said clamping device being of such size that it may be received within the lines of the said plate, and means for reciprocating the movable jaw within said yoke member.

Des Moines, Iowa, June 30, 1917.

JOSEPH S. CARSWELL.

Copies of this patent may be obtained for five cents each, by addressing the "Commissioner of Patents, Washington, D. C."